Feb. 23, 1926. 1,574,481
W. T. HENSLEY
APPARATUS FOR AND PROCESS OF MAKING PULLEY UNITS
Filed Sept. 29, 1923 9 Sheets-Sheet 1

Inventor
William T. Hensley
Lloyd L. Evans
By
Attorney

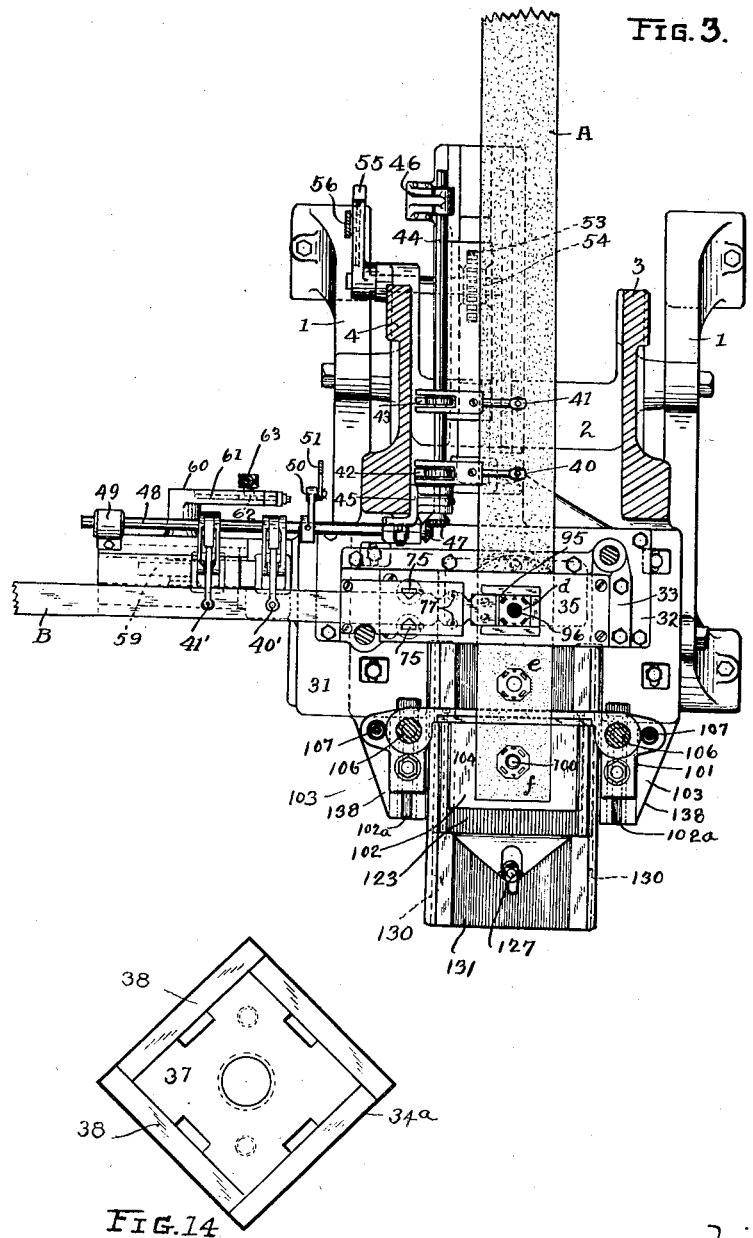

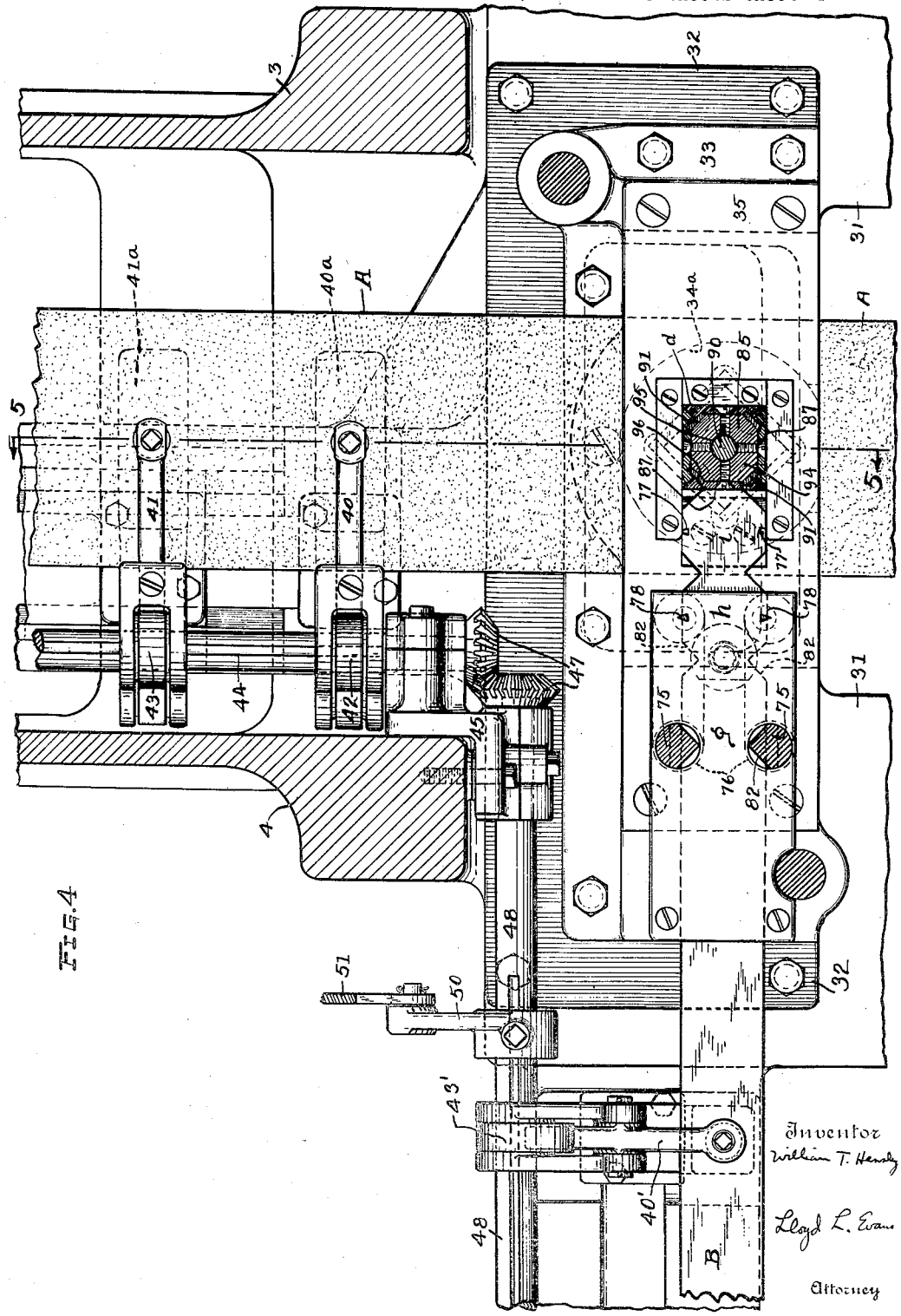

Feb. 23, 1926.
W. T. HENSLEY
1,574,481
APPARATUS FOR AND PROCESS OF MAKING PULLEY UNITS
Filed Sept. 29, 1923    9 Sheets-Sheet 5
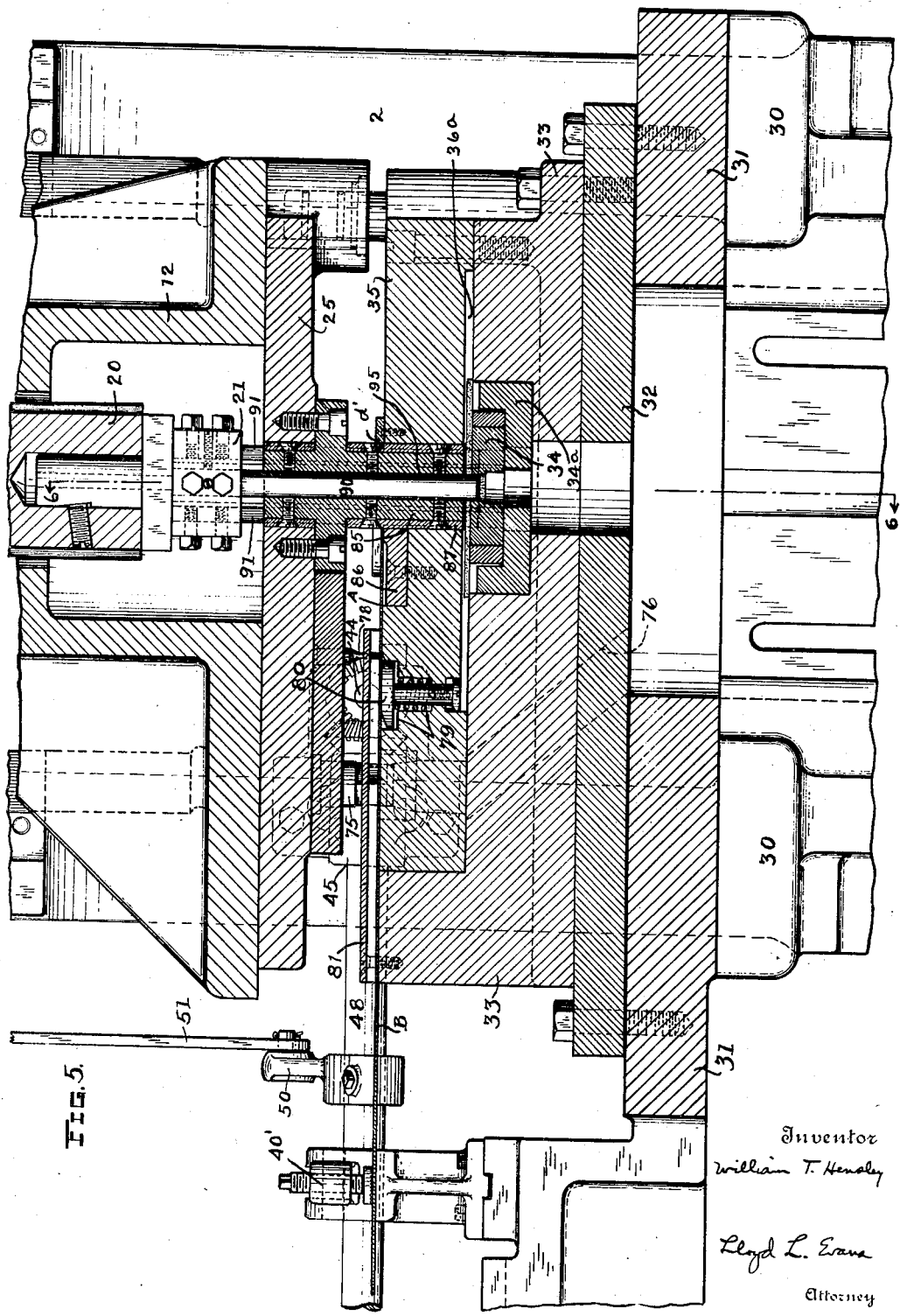
Inventor
William T. Hensley
Lloyd L. Evans
Attorney

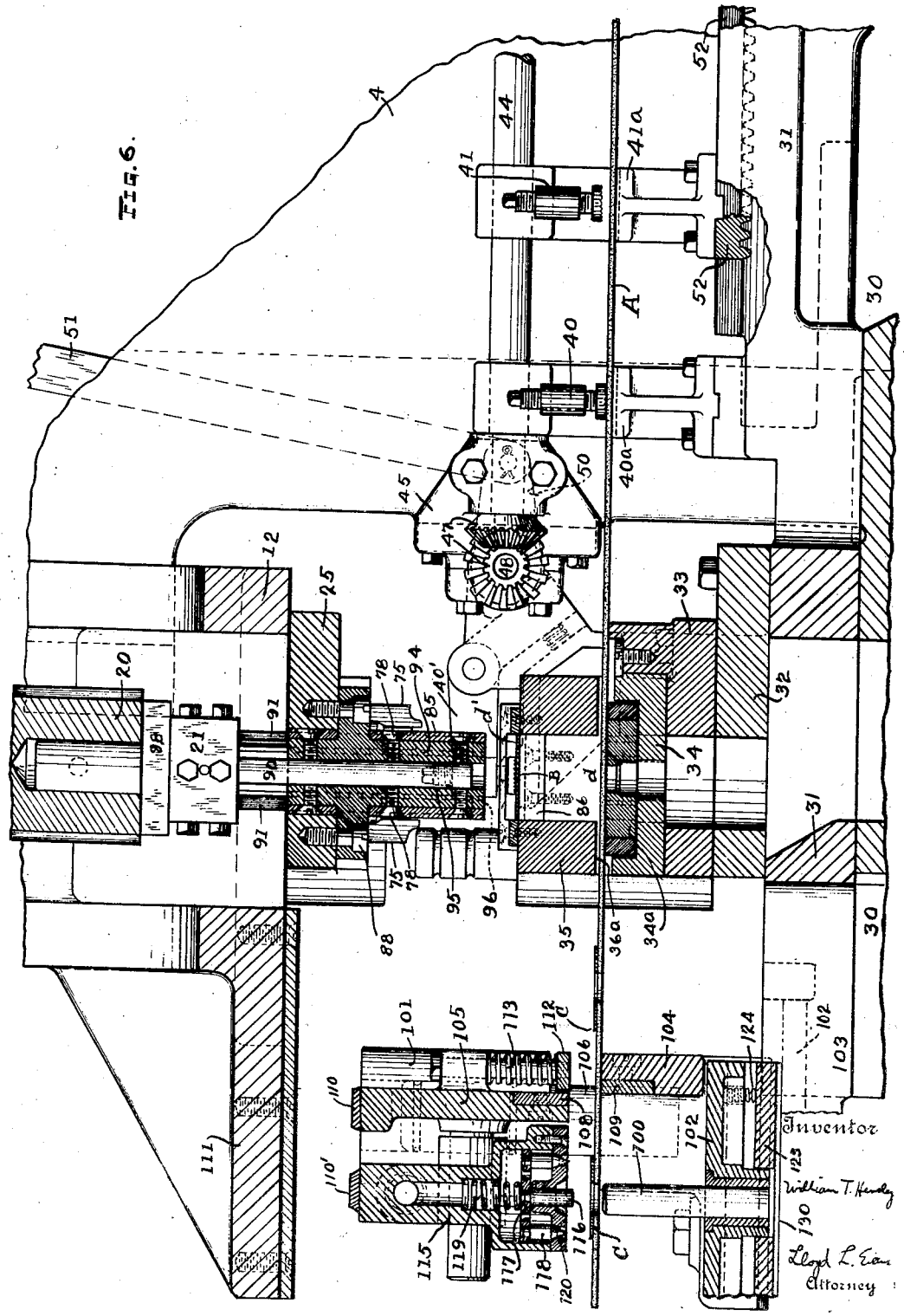

Feb. 23, 1926.
W. T. HENSLEY
1,574,481
APPARATUS FOR AND PROCESS OF MAKING PULLEY UNITS
Filed Sept. 29, 1923    9 Sheets-Sheet 7
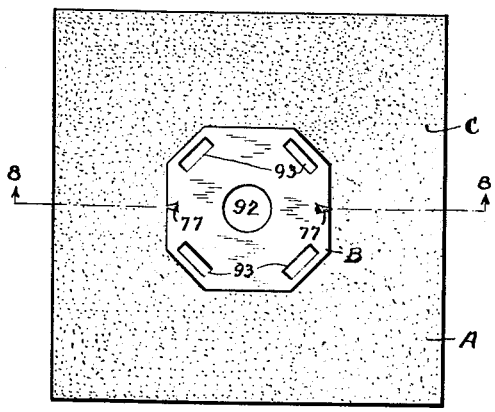
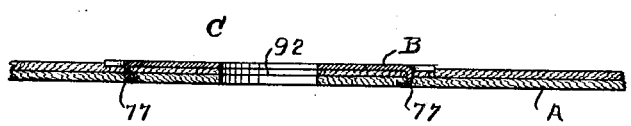
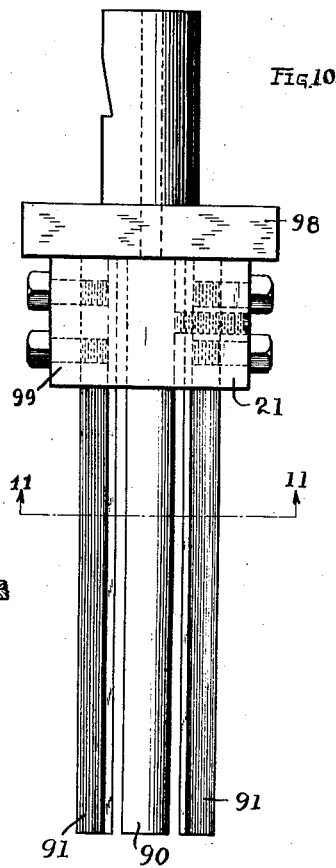
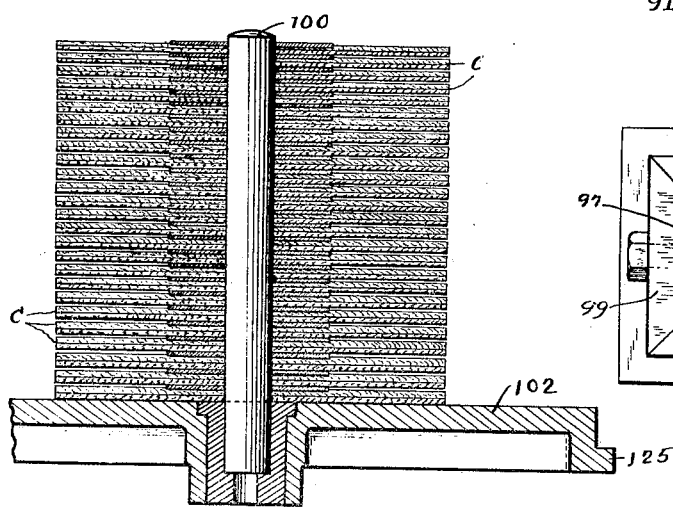
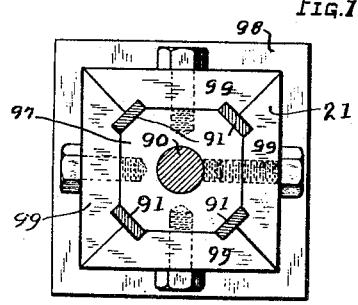
Inventor
William T. Hensley
Lloyd L. Evans
By
Attorney

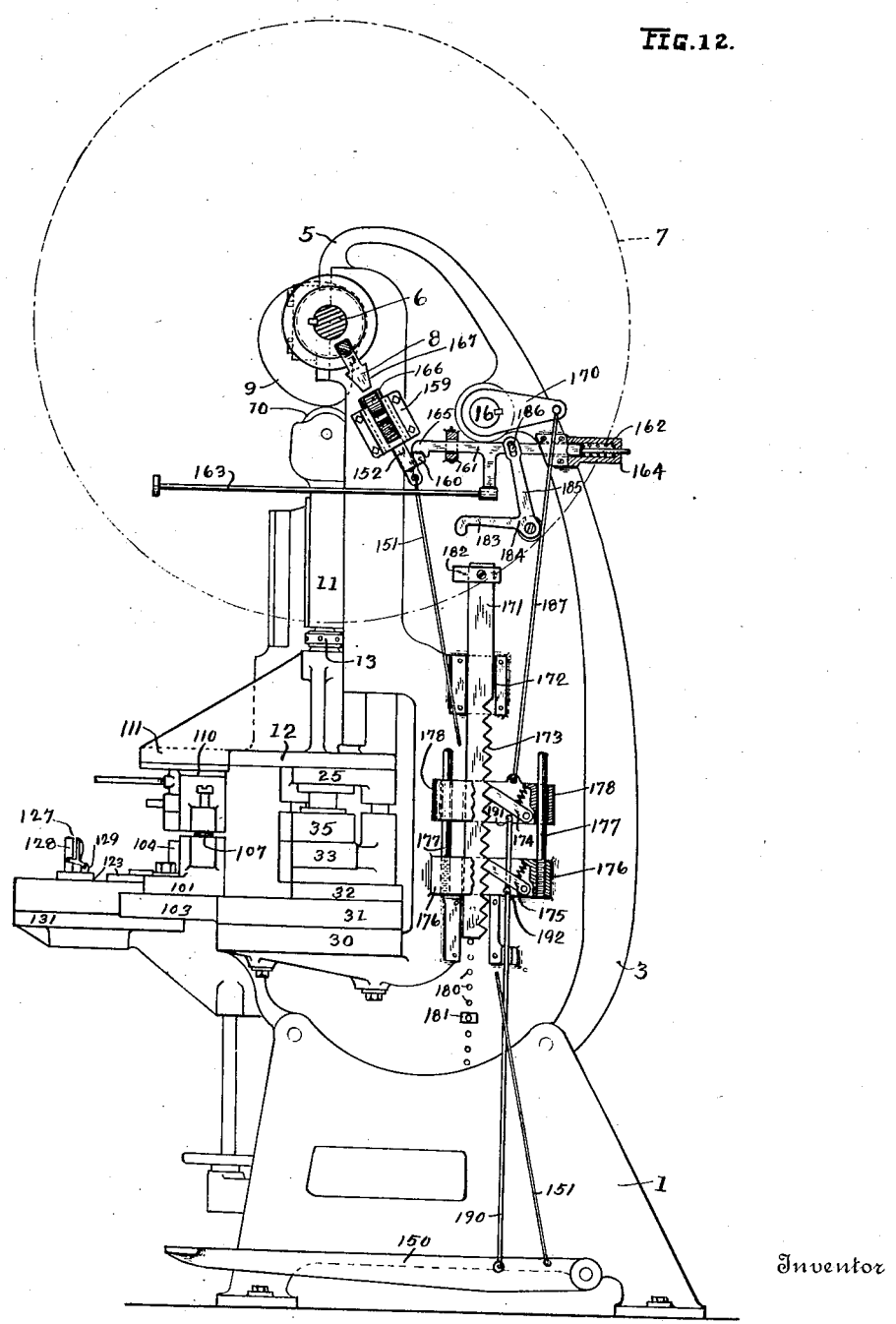

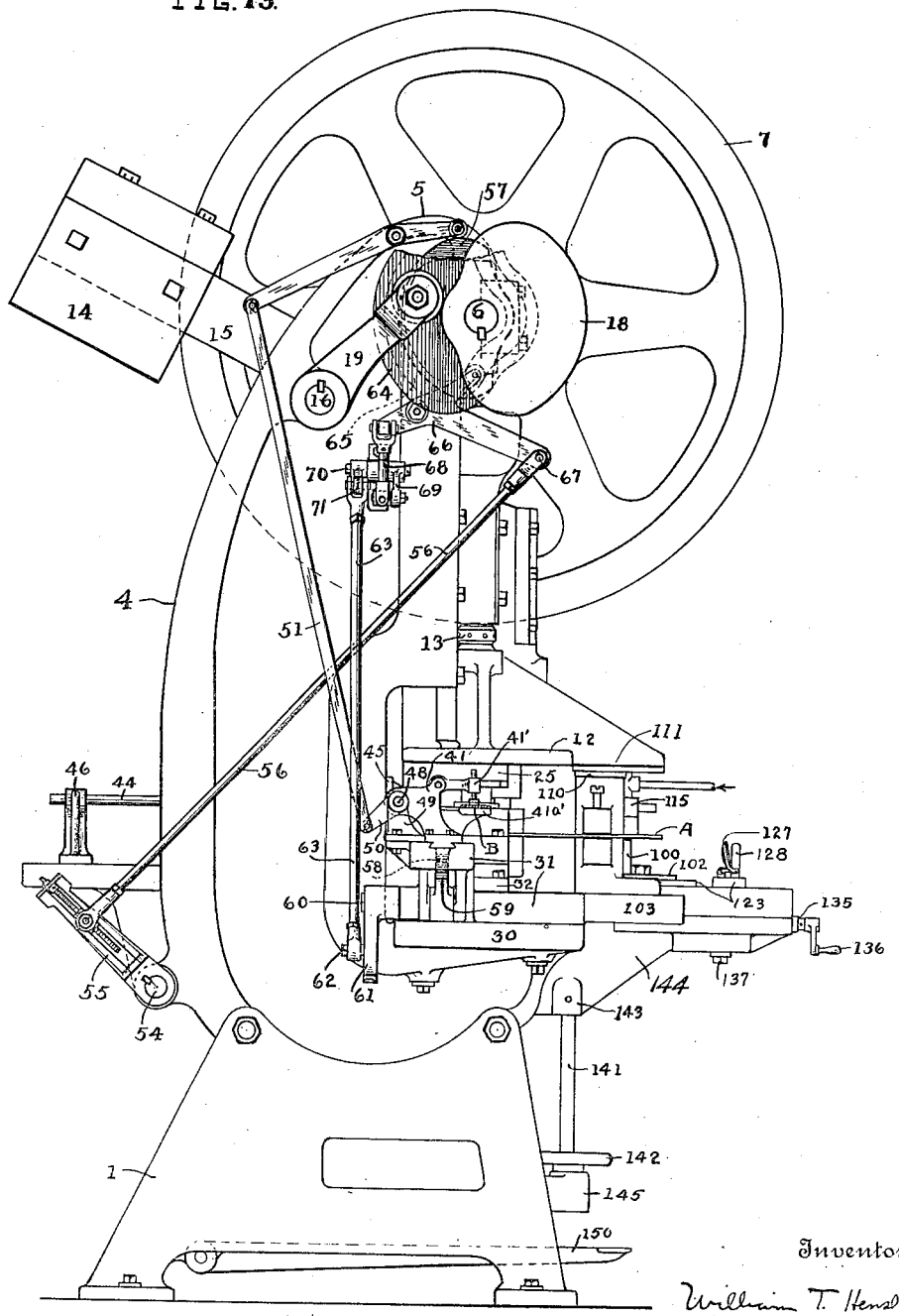

Patented Feb. 23, 1926.

1,574,481

UNITED STATES PATENT OFFICE.

WILLIAM T. HENSLEY, OF INDIANAPOLIS, INDIANA.

APPARATUS FOR AND PROCESS OF MAKING PULLEY UNITS.

Application filed September 29, 1923. Serial No. 665,690.

*To all whom it may concern:*

Be it known that I, WILLIAM T. HENSLEY, a citizen of the United States, residing at Indianapolis, in the county of Marion and State of Indiana, have invented a certain new and useful Improvement in Apparatus for and Processes of Making Pulley Units, of which the following is a full, clear, and exact description, reference being had to the accompanying drawings.

This invention relates to an apparatus and method for fabricating paper and metal to form units which may be used for the manufacture of pulleys or other articles.

An object of this invention is to provide a method for fabricating units from stock material, which units may be assembled and finished to form a complete pulley of the general type disclosed in my application Serial No. 610,175, filed Jan. 2, 1923, or to form any other article for which such units are adapted.

Another object of this invention is to embody suitable mechanism in a machine to automatically carry out my method and fabricate such units and to automatically assemble them, if desired, so that they may be subsequently utilized for the manufacture of pulleys, or other articles.

Another object of this invention is to provide an automatic machine which is simple in its construction and which will quickly, efficiently and cheaply fabricate the desired units and assemble them for the manufacture of pulleys or other articles.

More specifically, my invention comprises a method and a mechanism for feeding strips therethrough and advancing the strips simultaneously one above the other through a machine for the various operations to be performed to fabricate them into units by securing blanks from one strip concentrically to the other and perforating them and assembling them upon a receiving means. The mechanism also comprises means for notching one strip and striking tongues therefrom so that a blank cut therefrom may be readily secured to another strip; means for pressing a blank from one strip into the other strip and simultaneously perforating both the blank and the second strip; and means for depositing a liquid binder upon the units simultaneously with the shearing of the units from one strip and stacking them upon a suitable receiving means, such as an arbor.

Other objects will be apparent from the following description and annexed drawings.

In the embodiment of my invention herein disclosed I provide a mechanism which is particularly adapted for fabricating a metal strip and a paper strip for the formation of units such as disclosed in my application above referred to.

The strip frequently termed herein the "paper strip" may consist of any fibrous material for forming the laminæ of a pulley or the like and may comprise one or a plurality of layers. One good material for this purpose is what is commonly known as strawboard, but there are other fibrous materials which can be utilized. Such paper strip may comprise one or a plurality of layers of fibrous material secured together in any suitable manner, as by means of an adhesive binder. If more than one layer is used, it is often desirable to cross the grain in the various layers to ensure greater strength in the body of the fibrous material and to increase resistance against wear on the frictional engaging surface of the finished pulley. When the fibrous material comprises a plurality of layers, either two or more layers in one strip or a plurality of strips, it is desirable to apply adhesive to one surface of each layer or strip so that the members sheared from the strips will adhere to each other.

Similarly, in the embodiment herein shown the strip from which the relatively hard centers for the units are fabricated is termed the "metal strip," though it is obvious that it may be a relatively hard fibrous strip or any other relatively dense material to increase the density of the center of the finished pulley and to form a relatively hard core, as fully set forth in my prior application.

In the drawings,

Fig. 3 is a section of the press taken on line 3—3, Fig. 2, showing the lower half of the press in plan.

Fig. 4 is an enlarged view of that portion of Fig. 3 showing the strip feeding mechanism and the dies for fabricating the strips, the portions of the outer die being shown in section.

Fig. 5 is a vertical section through the dies for fabricating the strips taken on line 5—5, Fig. 4, and looking in the direction of the arrow.

Fig. 6 is a vertical section taken on line 6—6, Fig. 5 and looking in the direction of the arrow.

Fig. 7 is a plan view of one of the units formed by the press.

Fig. 8 is an enlarged fragmentary sectional view of the unit taken on line 8—8, Fig. 7.

Fig. 9 is a view of a plurality of units stacked on the arbor, ready to be removed from the press.

Fig. 10 is an enlarged elevation of the punch.

Fig. 11 is a section on line 11—11, Fig. 10 through the connecting portions of the punch looking upward into the punch.

Fig. 12 is an elevation showing the means for automatically stopping the press.

Fig. 13 is an elevation of the opposite side of the press from that shown in Fig. 2.

Fig. 14 is a plan view of the die.

Figure 1:
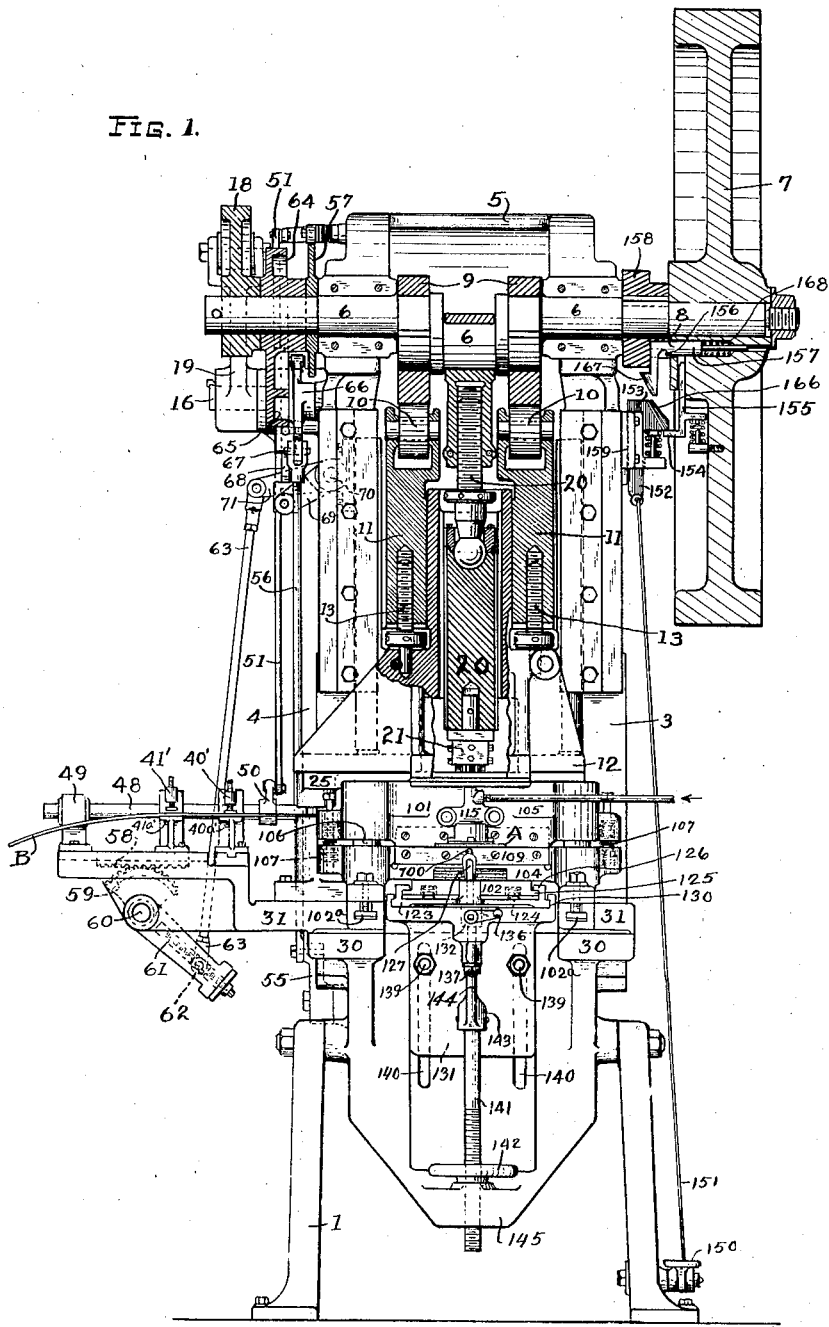
Figure 1 is a front elevation of a press equipped with the means for fabricating and assembling pulley units, some of the parts being in section to show their operation more clearly.
Figure 2:
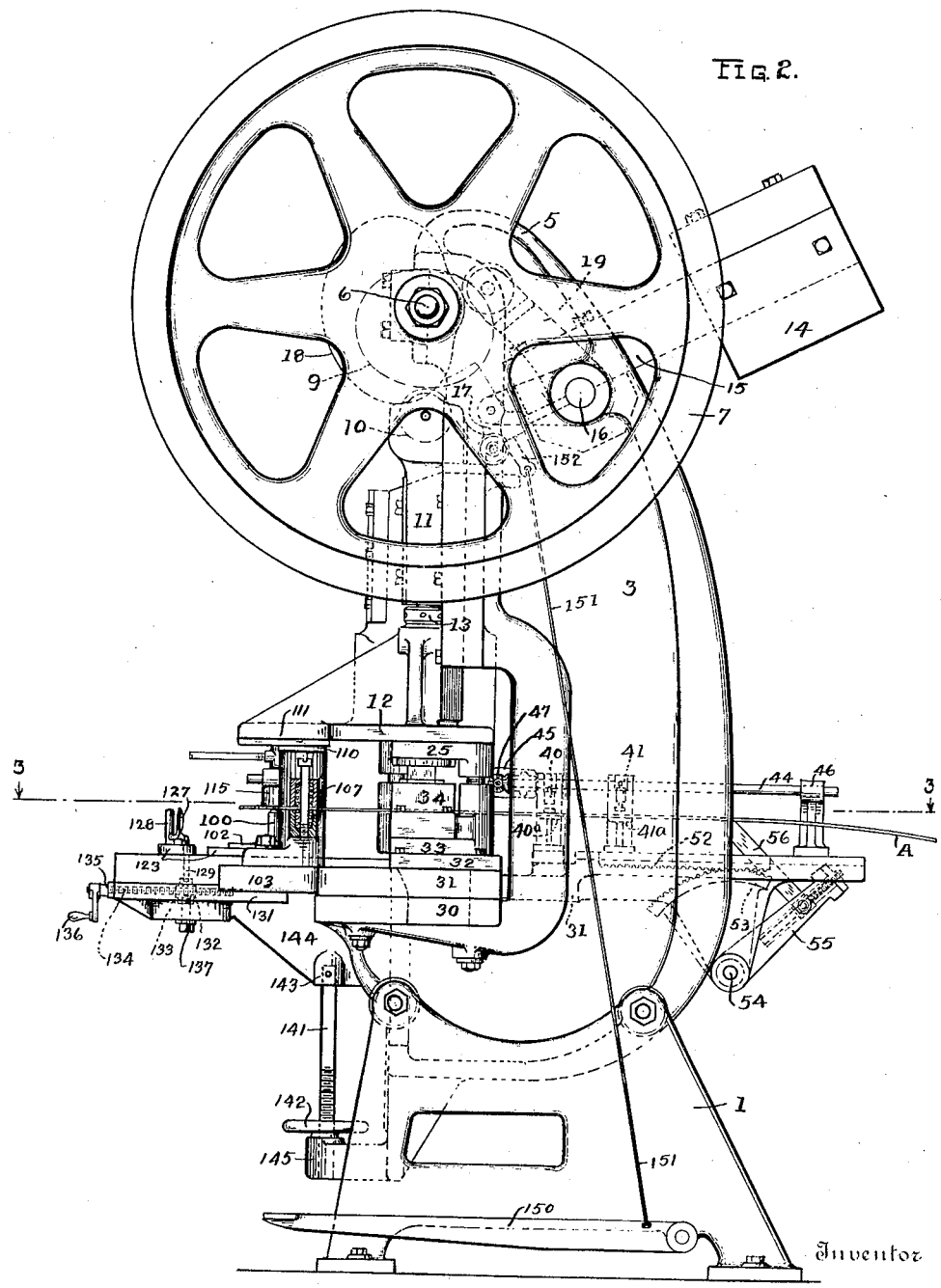
Fig. 2 is a side elevation of the press.

Referring to the drawings, 1 designates the base of the machine which carries the frame 2 comprising the side uprights 3 and 4 and the top cross piece 5. The crank shaft 6 is journaled in the side uprights 3 and 4. At one end of the crank shaft 6 the fly wheel 7 is carried and it may be driven from any suitable source of power, such as an electric motor (not shown). The fly wheel 7 is mounted to rotate freely on the crank shaft and to drive the crank shaft when the clutch 8 is thrown into engagement.

The crank shaft is provided with cams 9 which engage rollers 10 of reciprocating members 11, to which the ram 12 is adjustably connected by bolts 13. The cams 9 cause movement of the ram downward by engagement with the rollers 10. A counterbalance weight 14 is carried by the arm 15 which is clamped at its intermediate portion to the shaft 16, the latter being journaled in the side uprights of the frame. A link 17 is connected to the arm 15 and ram 12 to move the same upward as the counterbalance descends, thus causing the rollers to engage the cams 9. In order to positively move the counterbalance weight substantially in synchronism with the movement of the ram, cam 18 is provided which engages the roller on the arm 19, the latter being secured to shaft 16 to turn therewith, thus ensuring the rollers 10 approximately following the cams 9 upon the upward stroke of the ram, the counterbalance weight ensuring that a close contact is kept between the rollers 10 and the cams 9 in all movements of the ram.

Similarly, the crank shaft 6 operates the connecting rod 20 which is adjustably connected to the punch 21 and causes the latter to reciprocate within the ram 12, as is customary in double acting presses of this type, there being suitable guides provided for the movement of both the ram and punch.

Secured to the ram 12 is a punch holder 25 to carry the tools for working on one of the strips entering into the production of the pulley units. In the design of machine shown in the drawings, this strip is the metal strip B and its fabrication will be described hereinafter.

Carried on the knee 30 of the machine is a bolster 31 on which is mounted subplate 32 and the die block 33 in which the die holder 34 is mounted to carry the die $34^a$. The die $34^a$ comprises central member 37 having a central perforation to receive the perforating member 90 and it also has recesses around its periphery which, when closed by the die surrounding members 38, form apertures for the reception of perforating members 91 of the punch 21. Also mounted on the die block 33 is a bridge member 35 which is cut away at $36^a$ intermediate its ends so that it is spaced from the die $34^a$ to provide a passage to permit the paper strip A to be fed between the bridge 35 and the die $34^a$.

The metal strip B passes over the upper face of the bridge 35 where it is acted upon by the tools carried by the punch holder 25 of the ram 12, as will be more fully described hereinafter.

Both the metal strip B and the paper strip A are advanced by the feeding means inwardly upon each successive stroke of the press, the various positions or stations for the paper strip A being designated $d$, $e$ and $f$, while the metal strip passes through stations $g$, $h$, $i$, and is joined to the paper at station $d'$ to form a unit C which is not sheared from the paper strip until the latter reaches station $f$.

The paper and metal strips are fed through the machine by any suitable form of feeding means, a type of finger feed being shown in the drawing. Each strip is simultaneously fed forward a certain definite predetermined amount with each revolution of the crank shaft and upon the upward stroke of the ram 12 and the punch 21, so that the material from each strip necessary to form a single unit C is advanced one position or station at a time.

The feeding mechanism comprises generally a means for holding the strips in position while they are being operated upon by the descending ram and punch and for releasing the strips to permit them to be advanced into the next station by other means.

As the feeding means for either strip is quite similar, only one will be described in detail.

The feeding mechanism for the paper strip A comprises pivoted fingers 40, 41, the rear ends of which are actuated by the cams 42, 43, so that the end of the finger 40 is pressed down to clamp the strip against the stationary base member 40ª or is elevated to permit the finger 41 to clamp the strip against the movable base 41ª and move inwardly to advance the strip the correct amount for the next operation. The cams 42, 43 are carried by the shaft 44, which is carried by brackets 45, 46 and is driven through bevel gears 47 by the similar shaft 48 for the feeding means for the metal strip, which latter shaft is carried by the brackets 45 and 49. The shaft 48 is actuated through lever 50 and link 51, which in turn is operated by the cam 57 carried by the crank shaft to cause sufficient rotation of the shafts in one direction to move the fingers into clamping position and to cause rotation in the other direction to free them from clamping position. The shaft 48 in a similar manner carries cams to actuate the clamping tongues 40' and 41' which clamp the metal strip against the bases 40ª' and 41ª', respectively.

The finger 41 and base 41ª are carried by the reciprocable rack 52. The rack 52 is actuated by the segmental gear 53 pivoted at 54 to the bolster, the gear being operated by the lever 55 which is actuated by the link 56.

The cams 42, 43 are properly timed so that the finger 40 clamps the strip while finger 41 is in elevated position and moved outwardly. When in outward position finger 41 descends to clamping position and the finger 40 is caused to elevate to permit the rack and finger 41, which clamps the paper strip, to move forwardly to advance the paper strip the proper amount. This operation, of course, takes place while the punch and ram are ascending preparatory to the next stroke.

The link 56 is adjustably connected to the lever 55 for actuating the segmental gear, so that the length of reciprocation for feeding the strip can be varied, so that it will be advanced the proper distance at each reciprocation of the press.

Similarly, the rack 58 with the clamping finger 41' is reciprocated by segmental gear 59, pivoted at 60, and actuated by the lever 61, to which is adjustably connected, as indicated at 62, the link 63. The links 56, 63 are both actuated by the cam 64 carried by the crank shaft. The cam 64 has an internal cam groove 65 in which one arm of the pivoted lever 66 moves, the other end of the lever directly actuating the link 56 which is pivoted at 67 thereto. Connected to the lever 66 is a pivot link 68 which actuates the lever 69 pivoted at 70, which in turn actuates the short lever 71 connected to the upper end of the link 63, and in this manner both feed racks are caused to simultaneously reciprocate toward the center of the machine a predetermined distance simultaneously with the upward movement of the ram after the ram has risen sufficiently to allow the strips to move.

The operations performed on the paper and metal strips at the various stations will now be described. The metal strip passes along the top of the bridge member 35 and is first notched at station $g$ by the notch punches 75 carried by the ram punch holder 25 upon downward movement of the ram 12. The slugs fall through the passage 76 and out of the machine. The notches 82 formed in the strip at this station are V-shaped notches adjacent the edges of the metal strip with their apices disposed inwardly, so that when a single metal blank is later sheared from the strip at station $d$ it is of octagonal shape and is sheared across the line joining the apices, thus making the metal center blank conform more closely to the cross sectional shape of the finished cylindrical pulley.

The metal strip upon the next reciprocation of the press is advanced to station $h$ where tongues 77 are struck down from the strip by the members 78 carried by the punch holder 25. These tongues are formed adjacent the edges of the metal strip and are for the purpose of later securing the paper and blank together, as will be more fully described, to form a complete unit such as shown in Fig. 8. Beneath the metal strip at this position $h$ is disposed in a socket 79 in the bridge 35 a spring-pressed headed pin 80 to elevate the strip B after the tongues 77 are formed therein, so that the tongues will ride above the bridge when advancing to the next station and will not become bent, but will be straight upon reaching station $d'$, so that they may be driven through the paper strip. Secured to the die block 33 is an arch-shaped member 81 through which the notch punches 75 and punch member 78 pass. This member 81 serves actually as a stripper to prevent the metal strip B from following the notch punches 75 and the member 78.

Upon the next reciprocation of the press the metal plate in which the tongues have just been struck advances to station $i$, which is an idle station, for the tools for performing the operations on the strip just described must be wholly to one side of the paper strip in order that the slugs from the notches may pass downwardly without coming in contact with the paper strip and the metal blank must be concentric with but above that portion of the paper strip which is to form with it a unit C. At the position or station $d'$ the metal blank is sheared from the metal strip and immediately thereafter pressed down into the surface of the paper strip, driving the tongues 77 through the paper and turning them back and clenching them, so that the paper and metal blank are secured together to form a unit.

For accomplishing this the box shear 85 carried by the ram 12 is provided. Countersunk into the bridge member 35 is a shear blade 86 over which the metal strip is fed and which cooperates with the shear blade 87 of the box shear 85 to shear off the forward overhanging end of the metal strip on the line joining the apices of the notches 82 in the metal strip, and press the metal blank into the paper strip A. After the box shear has pressed the metal blank into the paper the shear remains in this position for a definite period of the stroke, called the dwell, and which is regulated by the cams 9. During this dwell the punch 21 carrying the perforating members 90, 91 descends through the box shear 85, the latter having guides 95, 96 for the various perforating members and perforates the unit as a whole, passing through both the metal blank and paper strip or strips. Immediately underneath the box shear and concentric therewith is the die 34 located in the die holder 34$^a$ with suitable perforations 92, 93 therein to receive the perforating members 90, 91, the under portion of the die being cut away to permit the slugs to fall out of the machine.

The box shear 85 which is detachably secured to the ram punch holder 25 of the ram 12 by any suitable means, such as screws 88, comprises a symmetrically disposed member 94 and four interchangeable shear blades 87 removably secured thereto so that they may be replaced when worn. It will be noted, however, that only one of the shear blades 87 cooperates with the shear blade 86 to shear a blank from the metal strip B.

Extending through the central member 94 of the box shear is a central guide 95 through which the central perforating member 90, which perforates the center hole 92 in the unit C, passes. Additional guides 96 are formed in the shear 85 to receive the perforating members 91 which form the required number of perforations 93 in the unit C surrounding the center hole, there being four such perforations shown in this design for later receiving the rivets. The guides 96 are symmetrically disposed and are formed by the conformations of the removable, interchangeable shear blades 87 and central member 94. It will thus be seen that the blades 87 may be interchangeable or the box shear removed and secured to present any desired shear blade to the shearing position. The perforating members 90, 91 are removably secured to the central portion 97 of the head 98 by clamping means 99, as shown in Figs. 10 and 11, which head in turn is removably secured to the punch 21.

The operations performed at position $d$ comprise perforating the center hole 92 which permits units to be passed over the arbor 100, as will be seen, and perforating the required number of rivet holes 93, there being four shown in this instance, through which rivets or dowels may be subsequently passed for securing the units together, as fully disclosed in my application above referred to.

In addition to the shearing and perforating at this station, the tongues 77 are driven through the paper and clenched so that the metal is permanently and accurately positioned with respect to the paper for the succeeding operations. The paper forming the single unit, however, at station $d$ is not severed from the paper strip at this station but the unit is carried forward with the metal plate attached to it to station $e$ where it is idle and thence to station $f$. The paper unit C when advanced to position $f$ is concentric with and above the arbor 100.

The shear 101 is adjustably mounted in the guides 102$^a$ on the forwardly extending bolster arms 103 and comprises a lower shear blade holder 104 and an upper shear blade holder 105 connected together, and the shear is carried by the overhanging portion of the bolster. The lower shear blade holder 104 carries guide posts 106 on which the upper shear blade holder 105 slides. Adjacent the guide posts 106 are springs 107 which keep the shear blades normally separated or in open position. The shear blades 108 and 109 are each set into and detachably secured to the shear blade holders. The upper shear blade 108 is actuated by the descent of the overhanging portion 111 of the ram 12 which comes in contact with a suitable striker member 110 on the upper portion of the upper shear blade holder and depresses it, so that the shear blades 108, 109 pass each other, thus cutting off a unit C from the paper strip.

Mounted upon the upper shear blade holder 105 is a stripper plate 112 having provision for vertical motion and kept normally depressed by two springs 113, one located at each end of the stripper, so that upon the downward motion of the upper shear blade holder in the cutting off process above described, this stripper plate presses upon the upper portion of the strawboard strip and holds it firmly in position during the shearing operation, and prevents the edge of the paper from being carried upwardly by the shear. Upon upward movement of the ram 12, the upper shear follows and assumes the open or normal position.

Adjustably mounted on the upper shear blade holder is located a pot 115 containing a suitable liquid binder to be deposited upon the surface of each unit C when the unit is being pushed down upon the arbor. The adjustment above mentioned is provided for the purpose of locating the plunger pin 116 of the pot immediately above and concentric with the arbor 100, and in alinement with the central apertures 92 in the units C, it being understood that units of various dimensions may be made on this machine.

When the upper shear blade holder 105 is depressed, the plunger pin 116 is pressed upwardly due to its contact with the upper end of the arbor 100, and the plate 117 carrying a plurality of valve pins 118 is lifted against the pressure of spring 119 away from the valve seats 120 to permit the liquid binder to run down through the apertures and upon the surface of the unit C just being pressed down on the arbor. Upon movement upward of the pot, the spring 119 forces the plate down and forces the valve pins 118 against their seats 120, thus closing the openings to prevent further deposition of the binder. Thus at station $f$ for every movement of the ram downward a unit C is cut off and pressed down upon the arbor 100 and the liquid binder is deposited on its surface. Any suitable binder, such as casein glue or sodium silicate, may be used for this purpose in manufacturing pulleys.

The arbor 100, together with its base 102, is yieldingly mounted upon the inner portion of the slide 123, there being springs 124, seated against the bottom of the slide and normally holding the base of the arbor with its flanges 125 up against the inturned flanges 126 of the slide. This is in order to relieve the shock of the upper shear holder and glue pot upon pressing the last units C down upon the arbor.

The handle 127 attached to the outer portion of the slide 123 comprises a fixed member 128 and a manually operated pin 129 which is yieldingly projected and manually withdrawn for a purpose about to be described.

The arbor 100 is mounted for inward or outward movement with the slide in order that the assembled units thereon may be moved outwardly to clear the overhanging portion of the paper strip and the upper shear holder, so that the arbor with its contents can be bodily removed and replaced by another arbor to receive another assembly of units, after which the slide is pushed inwardly to its proper receiving location.

The slide 123 is reciprocable in the guides 130 in the table 131 and the table is provided with an additional guide 132 in which is mounted a longitudinally adjustable block 133 having a detent with which the manually operated pin engages to properly locate the slide 123 and consequently the arbor with respect to the central opening of a unit C and the pin 116 of the pot 115. The block 133 is internally threaded to receive the screw 134, and the forward portion 135 of the screw is provided with a handle 136 secured thereto so that upon turning the handle 136 the block may be adjusted to any desired position. In addition, a suitable clamping means 137 may be provided to clamp the block after it has been adjusted to any desired position.

The table 131 is carried by the base of the machine and extends into and between the forwardly projecting arms 138 of the bolster 31 and is secured to the frame of the machine by bolts 139 which are movable in the guide slots 140. The table is therefore vertically adjustable up and down and this adjustment may be made by the screw 141 and hand wheel 142. The upper end of the screw is suitably secured in the socket 143 in the web 144 of the table and the lower end engages the hand wheel 142 which is mounted upon a projecting arm 145 from the base of the machine. It will thus be seen that upon manipulation of the hand wheel, the table may be set to any desired position to accommodate an arbor for any predetermined number of units to be assembled thereon, as this is necessary in order to make pulleys having various widths of faces.

In order to provide an automatic mechanism for stopping the machine when any predetermined number of units necessary to make a pulley of any given width of face has been assembled upon the arbor 100, I have designed an automatic stop mechanism, diagrammatically shown in Fig. 12. The automatic stop mechanism, being closely connected with the means for operating the machine, will be described in conjunction therewith.

Assuming the fly wheel is driven loosely upon the free end of the crank shaft 6 from any suitable source of power, the operator to start the machine must depress the foot treadle 150 which causes the rod 151 to move downwardly and pull the member 152 downwardly. The upper portion 153 of the member 152 extends outwardly sufficiently to engage the lug 154 of the spring-pressed pin 155 and consequently movement of the member 152 pulls the spring-pressed pin 155 out of engagement with the detent 156 in the clutch member 157, the clutch member being mounted and yieldingly urged by spring 168 toward the opposing clutch member 158 on the crank shaft when the locking pin 155 is withdrawn, and engages the opposing clutch member, thus driving the crank shaft 6.

The member 152 is reciprocable in the guide 159 on the side upright of the frame of the machine. The lower end of the member carries a lug 160 which in its downward travel engages the curved inner end of the slide rod 161 and forces the same backwardly against the pressure of the spring 162 until the lug 160 is disposed beneath the slide rod 161, when the slide rod will be forced forwardly by the spring to engage the upper face of such lug and hold the member 152 in depressed position, so that the press operates until it is manually stopped or automatically stopped, as will be described.

A push rod 163 is connected at one end to the slide rod 161, the forward end being disposed so that the operator may manually push the same rearwardly. When the rod 163 is pushed rearwardly the slide rod is moved back against the pressure of the spring 162 which is carried in the housing 164 and this disengages the outer end 165 of the slide rod 161 from the lug 160 of the member 152, so that member 152 with its inclined surface 166 will engage the inclined surface 167 of the clutch member 157 and force the same out of engagement with the opposing clutch member and against the pressure of the spring 168 until the detent 156 comes in alinement with the spring-pressed pin 155, at which time the pin engages the detent and locks the clutch out of engagement.

Means for automatically throwing out the clutch and stopping the press when a predetermined number of units has been assembled on the arbor will now be described. As previously described, the shaft 16 rotates a few degrees in one direction and then in the other direction so that the arm 170 which is keyed thereto is given a reciprocating motion. The rack bar 171 is mounted in the guide 172 for movement vertically up and down. One edge of the rack bar is provided with rack teeth 173 which are engaged by suitable pawls 174 and 175 to elevate the rack bar step by step. Secured to the side upright of the frame of the machine is a member 176 carrying guides 177 on which is slidably mounted a similar member 178. These members 176 and 178 carry spring-pressed pawls 174 and 175, respectively, to engage the rack teeth, the rack bar being actuated vertically by these members.

Located in the frame members 3 and 6 in alinement with the rack bar 171 is provided a series of holes 180 in any one of which is adapted to be placed a suitable stop member 181 to limit the downward movement of the rack bar when it is released, as will be described. The upper end of the rack bar carries an arm 182 to actuate the arm 183 of the bell crank lever 184, the other arm 185 of the lever being slotted to receive a pin 186 carried by the slide rod 161. Continued upward movement of the rack bar 171 after the arm 182 engages the arm 183 of the lever causes the slide rod to be moved rearwardly against the spring 162, thus causing the clutch to be thrown out and the machine stopped, as previously described.

The movement upwardly of the rack bar 171 is caused by reciprocation of the arm 170 to which is connected the upper end of the rod 187, the lower end of the rod being connected to the slidable member 178. One reciprocation of the press will cause the rod to move the rack bar up one notch and upon the downward movement of the arm 170 and rod 187 the rack bar will be held by the pivoted pawl 175 of the fixed member 176 while the upper pawl 174 will move down along the rack bar to engage the next rack tooth. It is obvious, therefore, that the rack bar may be so set that upon any predetermined number of reciprocations of the press the rack bar will be elevated sufficiently to move the slide bar backwardly so that the member 152 can force the clutch member 157 out of engagement with the opposing clutch member and thus stop the press.

When the member 152 moves upwardly, throwing the clutch out of engagement, the foot treadle 150 is also moved upwardly and the rod 190, which has pins 191, 192 secured thereto, causes the pawls 174, 175 to be elevated so that the rack bar does not engage the pawls and is free to drop downwardly until its movement is limited by the adjustable stop member 181, the position of which has been previously determined. When the foot treadle is again depressed this cycle will be repeated and another assembly of units formed on the arbor 100 and the press automatically stopped.

It will thus be seen that the fabrication of units C and their assembly on arbors for finishing into completed pulleys is automatically accomplished by utilizing my machine and my method of manufacture. Briefly, the method comprises feeding the relatively soft fibrous strip or strips successively step by step through the machine and feeding simultaneously through, and superposed above, the relatively hard strip which is notched and tongued and, after positioning the same concentrically above the fibrous strip, a blank is then sheared off and pressed down into and secured to the fibrous strip. While so held the blank and strips are simultaneously perforated as desired, the perforating tools passing through the guides in the box shear which has pressed the blank into the fibrous strip and held it there for this operation. The unit is then advanced until it is above and concentric with a removable arbor when it is sheared off and pressed down on the arbor, and at the same time receives a suitable deposit of liquid binder for binding the units together when they are pressed in another operation, as disclosed in my prior application referred to.

It will also be seen that with my machine provision is made for fabricating strips of varying widths and shearing them to various lengths to form rectangular units of different sizes, so that an assembly of units of different dimensions can be made on this machine. Furthermore, the various elements of the machine are adjustable, so that desired numbers of units of desired dimensions may be assembled upon the arbors to later form finished pulleys having different diameters or widths of faces. It is of course obvious also that by changing the tools the center hole and rivet holes may be made of various sizes and any desired number of rivet holes can be made instead of the four holes herein shown, and they can be disposed as desired.

For example, if it be desired to make units C larger than those indicated in the set up of the machine shown in the drawings, it is necessary to provide a new ram punch holder with the notching punches and tongue members properly disposed to correspondingly notch and tongue a wider strip B. It is also necessary to provide a die of the proper size to receive the corresponding perforating members. The adjustable connections between the link 56 and lever 55 and between the link 63 and lever 61 must be adjusted so that the strips A and B will be fed forward at each reciprocation of the press a larger amount corresponding to the increase in the width of the strips. The adjustable shear 101 must be adjusted forwardly, that is toward the operator, so that the unit C will be sheared at the correct line to make the perforation 92 come in the center of the unit C when the unit is sheared from the strip. Also the block 133 must be adjusted properly so that the slide 123 will properly position the arbor with respect to the central perforation 92 of the unit C as it is sheared from the strip A.

While I have shown as my preferred form a base with the arbor thereon for receiving the various units after they have been sheared, it is obvious that the units may be stacked on a base with suitable side guides or other means, it being essential only that they be substantially concentrically assembled in piles of a predetermined number, ready to have the rivets passed through them and to be pressed, as previously referred to. In this connection it will also be seen that it is of considerable value to provide assemblies of units of a predetermined number, so that they may be quickly removed by the operator without counting them and finished to form a pulley of a predetermined width of face.

It is of course obvious that if pulley units of smaller size are desired corresponding adjustments of the machine and corresponding tools must be supplied to obtain any predetermined size of unit.

The feeding means for the strips are merely indicated herein as feeding the strips substantially at right angles to each other, but this is a matter of convenience, as it is readily conceivable that the strips may be fed parallel to one another or at other angles, and the other fabricating means can be arranged to produce the same results.

It will also be noted that while I have shown the upper strip as being narrow to form blanks of less dimension than those from the lower strip, the upper strip may be of the same width or larger and blanks therefrom of the same dimension or larger than those cut from the lower strip. Thus units can be made with my machine which will comprise blanks of the same size and they may be of the same or different materials.

In case it is not desired to fabricate units with relatively small dense centers, fibrous strips of a single lamina or of a plurality of laminæ can be used for both the strips A and B disclosed herein and when fabricated in my machine by feeding the fibrous strips at an angle to each other the grain in the units will be crossed, and this is true of course regardless of the relative sizes of the strips, that is they may be of the same size or different sizes. Obviously also, one such strip may be of relatively soft material and the other of relatively hard material, and, if desired, both may be strawboard.

By feeding two fibrous strips at an angle to each other so that the grains will be crossed it is possible for many purposes to use one or more laminæ of relatively thin fibrous material for each strip such as is commonly furnished in rolls and thus form units of any desired thickness and with fibrous material having the grain crossed. It is of course possible to do this in conjunction with my metal center plate herein disclosed by arranging the feeding means to feed a fibrous strip through the press at an angle to the strip A and on the side opposite from that on which the strip B is fed, that is, from right to left in Fig. 3 and disposing the blanks sheared therefrom so that they will be placed upon the strip A in such manner that they will be beneath and concentric with the metal plate when it is sheared and pressed down upon them.

When a plurality of relatively thin laminæ forming one strip is used, it is best to apply adhesive at least to one surface of each lamina so that it will adhere to the adjacent lamina. This can be done in any well known way as by passing the laminæ over a roll having adhesive thereon. Furthermore, when two or more fibrous strips are used, the desired surfaces of the strips may have adhesive applied thereto before reaching the shearing position, so that when a blank from an upper strip is pressed thereon it will adhere thereto.

It will thus be seen that my machine is adapted to form and assemble fibrous units with or without a metal plate or other relatively hard member disposed thereon, which units may be subsequently fabricated to form pulleys, gears, wheels, or any other useful articles for which they may be adapted.

It will be seen that when it is desired to use only paper or fibre strips the punches to strike out tongues can be omitted and any suitable means substituted for providing securing means to hold the blank from one strip to the other strip at position *d*. Or they both may approach the central position *d*, having been perforated previous thereto, and both be sheared off while at the central position, and assembled in this position upon a receiving arbor.

In the units shown in the drawing the metal is not shown pressed into the surface of the fibrous material until it is entirely flush therewith. It is to be understood, however, that the metal blanks can be pressed or crushed into the body of the fibrous strip so that they are flush with the surface if desired. It is essential, however, when a relatively soft fibrous material be used beneath the metal blank that it be sufficiently condensed to permit simultaneous perforation of the metal and fibrous material with the metal disposed on top.

In the manufacture of pulley units it is preferable in most instances to press the metal sufficiently into the strawboard or other fibrous material so that the upper surface is substantially flush. This facilitates the spreading of the drops of liquid binder that are dropped on the surface of the units when they are stacked on the arbor due to the pressing action thereon which causes them to engage throughout their entire surfaces. Also, in case it is undesirable to have the binder dry out, it is preferable to have no spaces between the various units in the pile. It is obvious, however, that this matter can be arranged at the will of the operator to secure results desired.

When it is desired to form complete pulleys such as disclosed in my prior application referred to, the assembly of units stacked on the arbor is removed and rivet bars are inserted through alined apertures in said units. End plates are then disposed thereon and the whole assembly pressed together and the ends of the rivets are split or partially expanded, to hold the end plates and assembly in position for drying. The fibrous mass is then dried, during which operation it shrinks. After drying, the pulleys are again pressed to take up the shrinkage and to head the rivets over to hold the end plates tightly in position against the body of the pulley which is permanently shrunk by the drying process. The assembly is then finished by trimming the outer surface of the pulley, as by turning, until it is substantially cylindrical. It may of course be finished with a crowned surface such as is commonly used in pulleys.

The pulley may then be finished by boring the center hole to the correct size, forming the key seat and providing the threaded apertures to receive the set screws, all as disclosed in my prior application.

In case it is desired to have the corners of the units removed or to have them more nearly circular, so that there will be less trimming or turning required to form the finished, substantially cylindrical pulley, it is obvious that a notching mechanism may be provided to notch the strip A, to remove such corners before the units are stacked on the arbor.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a machine of the class described, the combination with means for advancing a plurality of strips therethrough toward the center of the machine, in different horizontal planes, of means for shearing blanks from each of said strips, and means for stacking the blanks concentrically upon a receiving member in the same relative vertical position.

2. In a machine of the class described, the combination with means for advancing a plurality of strips therethrough toward the center of the machine, in different horizontal planes and at an angle to each other, of means for shearing blanks from each of said strips, and means for stacking the blanks concentrically upon a receiving member in the same relative vertical position.

3. In a machine of the class described, the combination with means for feeding a plurality of strips, of means for successively cutting off and positioning blanks from one strip substantially concentrically on successive portions of another strip to form units, means for separating successively the units from the second named strip.

4. The combination with a press, of means for feeding a plurality of strips, means for successively cutting off and positioning blanks from one strip on successive portions of another strip to form units, means for separating successively the units from the second named strip and assembling them substantially concentrically in a pile.

5. The combination specified in claim 4 in which there is means for depositing a liquid binder upon each unit during the separating operation.

6. In a machine of the class described, the combination with a means for feeding a pair of strips one disposed above the other through the press, of means for cutting off the forward portion of the upper strip and positioning it concentrically on the lower strip upon each reciprocation of the press to form a unit, and means for successively shearing said units from said lower strip and simultaneously stacking them in a pile.

7. In a machine the combination with means for feeding strips therethrough, one above the other, of means for shearing a blank from the forward portion of one strip and depositing it concentrically on the other strip to form a unit, means for perforating the unit centrally, and means for shearing the unit from the second named strip and depositing it upon a receiving device by means of said central perforation.

8. The combination claimed in claim 7, in which the shearing means is adjustable to shear the units of such a length that units of suitable predetermined size may be sheared with the blank concentrically disposed thereon.

9. The combination claimed in claim 7, in which a means is provided for depositing a liquid binder upon the surface of each unit when it is deposited upon the receiving device.

10. In a machine of the class described, the combination with means for feeding a first strip step by step therethrough, of means for feeding a second strip simultaneously step by step therethrough above the first strip, means for shearing a blank from the forward end of the second strip and pressing it on said first strip, means for perforating the blank and second strip when in this position, and means for successively shearing off the forward ends of the first strip and depositing them with the blanks thereon concentrically upon a receiving device.

11. The combination with a press, of means for advancing a fibrous strip step by step therethrough, means for advancing a metal strip therethrough, means for shearing a blank from the forward end of the metal strip and placing it concentrically upon the paper strip, and means for shearing off the forward end of the paper strip with the metal plate concentrically disposed thereon.

12. The combination with a machine, of means for advancing a first strip and a second strip through the machine, means for concentrically depositing a blank from the forward portion of the first strip on the second strip, means for advancing the second strip and means shearing off the forward end of the second strip with the blank concentrically disposed thereon.

13. The combination specified in claim 12, in which a means is provided for concentrically perforating the blank and second strip.

14. The combination specified in claim 12, in which a means is provided for simultaneously stacking the units of the second strip concentrically.

15. The combination with a press, of means for feeding a pair of strips, one disposed above the other through the press, means for cutting a blank from the forward portion of the upper strip, placing it and holding it concentrically on the lower strip, means for perforating the blank and strip while so held, and means for successively shearing units from said lower strip with the blanks thereon and simultaneously assembling them in a pile.

16. In a machine of the class described the combination with means for feeding a pair of strips one disposed above the other through the press, of punches for notching the upper strip, punches for striking tongues therein, means for shearing the forward end of said strip and pressing said sheared portion concentrically upon the lower strip to form a unit, means for perforating the unit, and means for successively shearing said units from the lower strip and assembling them in a pile.

17. In a machine of the class described the combination with means for simultaneously feeding a pair of strips, one above the other through the press in successive positions, of means for forming notches in the upper strip at one position, means for striking tongues in the upper strip at an advanced position, means for shearing a blank from the upper strip and pressing it on the lower strip at an advanced position to form a unit, means for perforating the unit, and means for shearing said unit from the lower strip at an advanced position of the lower strip and depositing it upon an arbor.

18. The combination with a double acting press, of means for simultaneously advancing a paper strip and a metal strip in different horizontal planes through the press step by step, of punches carried by the ram and reciprocable to operate on said metal strip, means for shearing off a blank from the forward end of said metal strip when it has advanced to a position directly above the paper strip, said shearing means being adapted to also press the blank concentrically into the body of the paper strip to form a unit, means for perforating said unit while in this position, and means for successively shearing said units from the forward end of the paper strip with the metal member concentrically disposed thereon and stacking them on a removable member.

19. In a machine of the class described the combination with means for feeding a paper strip and a metal strip step by step through a press in different horizontal planes of means for notching the metal strip in one position, means for striking tongues therefrom in an advanced position, and means for shearing a blank from the forward end of the metal strip when it is concentrically positioned above the paper strip and pressing said tongues into the paper strip to secure the blank thereto to form a unit, means for perforating said unit, and means for shearing successively such units from said paper strip and stacking them upon a removable member.

20. In a machine of the class described the combination with means for progressively advancing a pair of strips simultaneously in different horizontal planes of means for shearing a blank from the forward end of the upper strip and pressing the blank on the lower strip to form a unit, means for successively shearing the units from the lower strip and means for successively stacking such units and applying a binding means thereto.

21. A machine as specified in claim 20 in which means is provided to automatically stop the machine when a predetermined number of such units has been sheared and stacked on a receiving device.

22. In a machine of the class described the combination with means for progressively advancing a pair of strips simultaneously in different horizontal planes of means for shearing a blank from the forward end of the upper strip and pressing the blank on the lower strip to form a unit, means for perforating the unit, means for shearing successively the units from the lower strip and means for stacking the units on a removable member.

23. In a machine of the class described the combination with means for feeding a pair of strips disposed at an angle to each other and in different horizontal planes of means for shearing a blank from the forward end of the upper strip and positioning it concentrically upon the lower strip to form a unit, and means for successively shearing the units from the lower strip and stacking them concentrically upon a receiving member.

24. The combination with a press, of means for feeding a pair of strips disposed at an angle to each other and in different horizontal planes step by step a predetermined amount for each reciprocation of the press, means for shearing a blank from the upper strip and positioning it upon the lower strip to form a unit, means for perforating the unit during the same period of rest of the lower strip, and means for successively shearing the units from the lower strip and simultaneously stacking them concentrically.

25. The combination specified in claim 24 in which means are provided for adjusting the shearing means to shear units from various sized strips so that the blank is concentrically disposed on the unit.

26. The combination with a press, of means for advancing a fibrous strip step by step therethrough, means for advancing a relatively narrower strip simultaneously step by step therethrough, means for shearing a blank from the narrow strip and pressing it concentrically into the body of the fibrous strip to form a unit, means for perforating the unit, and means for shearing the unit from the fibrous strip.

27. The combination specified in claim 26 in which each unit is perforated concentrically, and in which means are provided for concentrically stacking the units on a receiving member.

28. The combination specified in claim 26 in which means for depositing a liquid binder upon each unit is provided.

29. The combination claimed in claim 26 in which means are provided for stacking the units concentrically on a receiving member and means are provided for automatically stopping the press when a predetermined number of units has been assembled on the receiving member.

30. The combination specified in claim 26 in which means are provided on the blank for securing the blank to the lower strip when the blank is pressed thereon.

31. In a machine of the class described, the combination with a means for feeding a relatively soft strip and a relatively hard strip simultaneously therethrough in different horizontal planes of means for shearing a blank from the forward end of the relatively hard strip and pressing the blank down into the relatively soft strip to position it substantially concentrically there and secure it thereto to form a unit and means for shearing successively such units from the relatively soft strip upon successive advancement thereof.

32. The combination specified in claim 31 in which tongues are struck from the relatively hard strip before the blank is sheared therefrom to assist in securing the blank to the relatively soft strip.

33. The combination specified in claim 31 in which the unit is perforated with a center hole and rivet or dowel holes before it is sheared off.

34. The combination specified in claim 31 in which the units are successively stacked concentrically on a receiving member.

35. In a machine of the class described the combination with means for feeding a relatively wide strip and a relatively narrow strip in different horizontal planes therethrough step by step a predetermined amount, of means for shearing a blank from the forward end of the relatively narrow upper strip and means for pressing it concentrically into the body of the lower strip to form a unit.

36. The combination specified in claim 35 in which means are provided for perforating the units so that they may be stacked on an arbor, and means for stacking them upon the arbor.

37. The combination specified in claim 35 in which the press is provided with means for automatically stopping it when a predetermined number of units have been stacked upon the arbor.

38. The combination with a press, of means for feeding a relatively wide strip and a relatively narrow strip in different horizontal planes step by step a predetermined amount, means for providing the upper strip with fastening members, means for shearing a blank from the forward end of the upper strip and positioning it concentrically and securing it to the lower strip to form a unit, and means for successively shearing the units from the lower strip as the latter is advanced with the feeding means.

39. In a machine of the class described the combination with means for simultaneously feeding a paper strip and metal strip a predetermined amount step by step, means for cutting blanks from the metal strip and pressing them successively into successive portions of the paper strip to form units, and means for cutting the units from the paper strip.

40. The combination with a press, of means for feeding through the press a paper and a metal strip at an angle to each other and in different horizontal planes step by step a predetermined amount, means for notching the metal strip in one position, means for striking tongues therefrom in an advanced position, means for shearing a blank from the end of the metal strip across the apices of the notches and pressing the blank onto the surface of the paper strip to form a unit and securing it thereto, means for simultaneously perforating a center hole and rivet holes in the unit, means for severing the unit from the paper strip in an advanced position thereof, means for stacking the unit with its central aperture disposed upon an arbor and simultaneously coating the unit with a binder, a crank shaft provided with cams and connecting rods for actuating each of said means in proper time relation, means for driving the crank shaft, and means for automatically stopping the crank shaft when a predetermined number of units has been stacked upon the arbor.

41. In a machine of the class described, the combination with a means for guiding a relative narrow metal strip and a fibrous strip therethrough, of adjustable means for advancing said strips a predetermined amount, means for shearing a blank from the metal strip and pressing it into the body of the other strip, means for perforating simultaneously the blank and second strip while the blank is held thereon, and means for shearing successively the forward portions of the second strip.

42. The combination specified in claim 41 in which the means for shearing the forward portions of the second strip is adjustable so that any predetermined length may be sheared from the forward portion of the second strip.

43. The combination with a press, of means for feeding and guiding a relatively soft fibrous strip, means for feeding above the fibrous strip a relatively hard strip of less width, each of said feeding means being arranged to advance the strips simultaneously a predetermined amount on each reciprocation of the press, means for shearing a blank from the forward end of the relatively hard strip and pressing it down into the surface of the fibrous strip, when said blank is concentrically positioned with respect to the width of the fibrous strip, to form a unit, means for perforating a central aperture and additional apertures in said unit, means for shearing successively the units from said fibrous strip, and means for stacking said units concentrically on a receiving member.

44. The combination with a double acting cam press, of a cam shaft with a fly wheel for driving same, a ram reciprocable by said cam shaft, a punch reciprocable by said cam shaft and guided within said ram, means for advancing upon each reciprocation of the press a relatively wide strip through the press from the rear, feeding and guiding means for advancing upon each reciprocation of the press a relatively narrow strip through the press at substantially right angles to said wide strip, notching punches and tongue striking punches carried by said ram and disposed to notch and strike tongues in portions of said narrow strip, a shear carried by said ram for cutting off a blank from the forward end of said narrow strip and pressing said blank onto said wide strip to form a unit, said cam shaft being designed to cause said ram to dwell in this position, perforating tools carried by said punch to perforate said blank and wide strip while the ram holds them together, means to shear a unit from said wide strip upon each downward movement of said ram, an arbor so positioned with respect to said shear that it underlies the central aperture in said unit, and means to coat the upper surface of each successive unit with a binding material.

45. The method of producing assemblies of blanks which consists in feeding a plurality of strips in different horizontal planes toward a central position and cutting blanks from each of said strips and stacking them concentrically upon a receiving member in the same relative vertical position as the strips.

46. The method of producing assemblies of blanks which consists in advancing a plurality of strips in different horizontal planes toward a central position and at an angle to each other, and cutting off blanks from each of said strips and stacking them concentrically upon a receiving member in the same relative vertical position as the strips.

47. The method of producing assemblies of blanks which consists in advancing a plurality of strips in different horizontal planes toward a central position and at an angle to each other, and cutting off blanks from each of said strips, perforating them, and stacking them concentrically upon a receiving member in the same relative vertical position as the strips.

48. The method of making units from a pair of strips each comprising one or more laminæ which consists in advancing these strips at an angle to each other simultaneously step by step, shearing a blank from one strip and depositing it concentrically upon the other strip, and shearing off a predetermined portion of the second strip with the blank concentrically disposed thereon.

49. The method of making units from a pair of strips each comprising one or more laminæ which consists in simultaneously advancing the strips step by step one above the other, shearing a blank from one strip and pressing it into the body of the other strip to form a unit, perforating the unit and successively shearing the units from the second strip so that the members of the units are concentric.

50. The method of making units from a pair of strips each comprising one or more laminæ which consists in simultaneously advancing the strips step by step one above the other, shearing a blank from one strip and pressing it upon the other strip to form a unit, perforating the unit, shearing the unit from the second strip and depositing the unit upon a receiving member.

51. The method of making units from a pair of strips each comprising one or more laminæ which consists in simultaneously advancing the strips step by step one above the other, shearing a blank from one strip and securing it to the other strip to form a unit, perforating the unit, and successively shearing the units from the second strip, and stacking them by means of the perforations.

52. The method as specified in claim 51 including the step of depositing a liquid binder upon the face of each unit when it is stacked.

53. The method of making units from a pair of strips each comprising one or more laminæ which consists in advancing the strips step by step one above the other, shearing a blank from one strip and depositing it upon the other strip to form a unit, successively shearing the units from said second strip and depositing them upon a receiving member.

54. The method of forming units which comprises cutting blanks from a relatively hard strip and pressing them into the body of a relatively wide, soft strip, and shearing off a portion of the soft strip with the blank concentrically disposed thereon.

55. The method of forming units which comprises cutting blanks from a relatively hard strip and providing the blanks with securing means, pressing the blanks into the surface of a relatively soft strip and securing them thereto, shearing off portions of said soft strip with the blanks thereon, and stacking them upon a receiving member.

56. The method of forming units which comprises cutting blanks from one strip, securing them concentrically to a second strip, and successively shearing off portions of the second strip with a blank concentrically disposed on each such portion.

57. The method of forming units which comprises cutting blanks from one strip and pressing and securing them to a second strip to form units, perforating the units, and shearing the units from the second strip and simultaneously stacking them upon a receiving member.

58. The method specified in claim 57 which includes coating the surface of each unit as it is stacked.

59. The method of forming stacks of pulley units for subsequent fabrication to form complete pulleys which consists in advancing strips of material through a press in different horizontal planes, shearing successively blanks from the upper strip and securing them successively to different portions of the lower strip to form units, perforating the units, shearing the units so formed from the lower strip, and stacking them upon a receiving means.

60. The method of forming a pulley unit which comprises cutting a blank from a metal strip, pressing the blank into the body of a relatively wider fibrous strip to form a unit, perforating the unit, and shearing the unit from the paper strip.

61. The method of forming pulley units which comprises advancing a metal strip of less width step by step through a press in a plane above a fibrous strip of greater width and simultaneously advancing the fibrous strip step by step through the press at an angle to said metal strip, successively shearing polygonal members from said metal strip and successively pressing them concentrically into said fibrous strip to form units, perforating said units, successively shearing the units from said fibrous strip and stacking them in a pile.

62. The method of producing assemblies of blanks of fibrous material having a grain, with the grains of different blanks disposed in angular relation, which comprises feeding a plurality of strips in different horizontal planes toward a central position, cutting blanks from each of the strips, and stacking them concentrically upon a receiving member in the same relative vertical position as the strips so that the grains of some of the blanks are disposed at an angle to the grains of other blanks.

63. The method of producing assemblies of blanks which consists in feeding a plurality of strips in different horizontal planes toward a central position, applying adhesive to the surface of any desired fibrous strip, cutting blanks from each of the strips, and stacking them concentrically upon a receiving member in the same relative vertical position as the strips.

64. The method of producing assemblies of blanks which consists in advancing a plurality of strips in different horizontal planes toward a central position, applying adhesive to the upper surface of one or more strips, cutting off blanks from each of said strips, and stacking them concentrically upon a receiving member in the same relative vertical position as the strips.

In testimony whereof, I hereunto affix my signature.

WILLIAM T. HENSLEY.